(12) United States Patent
Tu et al.

(10) Patent No.: US 11,930,573 B2
(45) Date of Patent: Mar. 12, 2024

(54) POWER SUPPLY DEVICE

(71) Applicant: Power Forest Technology Corporation, Hsinchu County (TW)

(72) Inventors: Rong-Jie Tu, Hsinchu County (TW); Hung-Chih Chiu, Taipei (TW); Chien-Lung Lee, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 17/960,140

(22) Filed: Oct. 5, 2022

(65) Prior Publication Data

US 2023/0209678 A1   Jun. 29, 2023

(30) Foreign Application Priority Data

Dec. 29, 2021   (TW) .................................. 110149269

(51) Int. Cl.
*H02M 1/00* (2006.01)
*H02J 3/00* (2006.01)
*H02J 3/14* (2006.01)
*H05B 45/3725* (2020.01)

(52) U.S. Cl.
CPC ........ *H05B 45/3725* (2020.01); *H02J 3/0075* (2020.01); *H02J 3/14* (2013.01); *H02M 1/0009* (2021.05); *H02M 1/0083* (2021.05)

(58) Field of Classification Search
CPC .... H02M 1/00; H02M 1/0003; H02M 1/0009; H02M 1/0083; H02M 3/335; H02M 3/33507; H02M 3/145; H02M 3/155; H02M 3/158; H05B 45/10; H05B 45/12; H05B 45/14; H05B 45/37; H05B 45/3725; H02J 3/007; H02J 3/0075; H02J 3/12; H02J 3/14
See application file for complete search history.

(56) References Cited

U.S. PATENT DOCUMENTS 9,742,293 B2 * 8/2017 Lin .......................... H02M 1/08
2018/0241308 A1 * 8/2018 Matsuura ............ H02M 3/1563

* cited by examiner

*Primary Examiner* — Long Nguyen
(74) *Attorney, Agent, or Firm* — JCIPRNET

(57) ABSTRACT

A power supply device is provided. The power supply device includes a power converter and a controller. The controller controls the power converter to generate an output power. The controller includes a first detection circuit and a second detection circuit. The first detection circuit detects the output power to obtain a first detection result. The first detection result is a variation of an output current value of the output power. The second detection circuit detects electrical characteristics other than the output current value to obtain a second detection result. The controller determines whether to limit output of the output power according to a relationship between the first detection result and the second detection result.

11 Claims, 5 Drawing Sheets

POWER SUPPLY DEVICE

CROSS-REFERENCE TO RELATED APPLICATION

This application claims the priority benefit of Taiwan application serial no. 110149269, filed on Dec. 29, 2021. The entirety of the above-mentioned patent application is hereby incorporated by reference herein and made a part of this specification.

BACKGROUND

Technical Field

The disclosure relates to a field of power supply, and more particularly, to a power supply device.

Description of Related Art

The current power supply device has a precise power detection method. By the precise power detection method, the controller of the power supply device may obtain at least the output current value of the output power, and control the operation of the power supply device through the output current value, thereby complying with the current safety standards (such as the safety standard IEC 60950-1, IEC 62368-1, and IEC 60065).

However, when the precise power detection method is invalid, the controller may not control the operation of the power supply device. Therefore, the power supply device may fail to comply with the safety standards, or even cause misoperation or cause safety hazards.

SUMMARY

The disclosure provides a power supply device, which may determine whether a precise power detection method is invalid, and accordingly provides a power supply method corresponding to the invalidation of the precise power detection method.

A power supply device in the disclosure includes a power converter and a controller. The controller is coupled to the power converter. The controller controls the power converter to generate an output power. The controller includes a first detection circuit and a second detection circuit. The first detection circuit detects the output power to obtain a first detection result. The first detection result is a variation of an output current value of the output power. The second detection circuit detects electrical characteristics other than the output current value to obtain a second detection result. The controller limits output of the output power according to a relationship between the first detection result and the second detection result.

Based on the above, the first detection circuit detects the output power to obtain the first detection result. The first detection result is the variation of the output current value of the output power. The second detection circuit detects the electrical characteristics other than the output current value to obtain the second detection result. The controller determines whether to limit the output of the output power according to the relationship between the first detection result and the second detection result. Therefore, the controller may determine whether the detection of the first detection circuit is invalid according to the second detection result. When the detection of the first detection circuit is determined to be invalid, the controller enables the power supply device to limit the output of the output power source. In this way, the power supply device may avoid misoperation and/or safety hazards that may occur when the first detection result is invalid.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
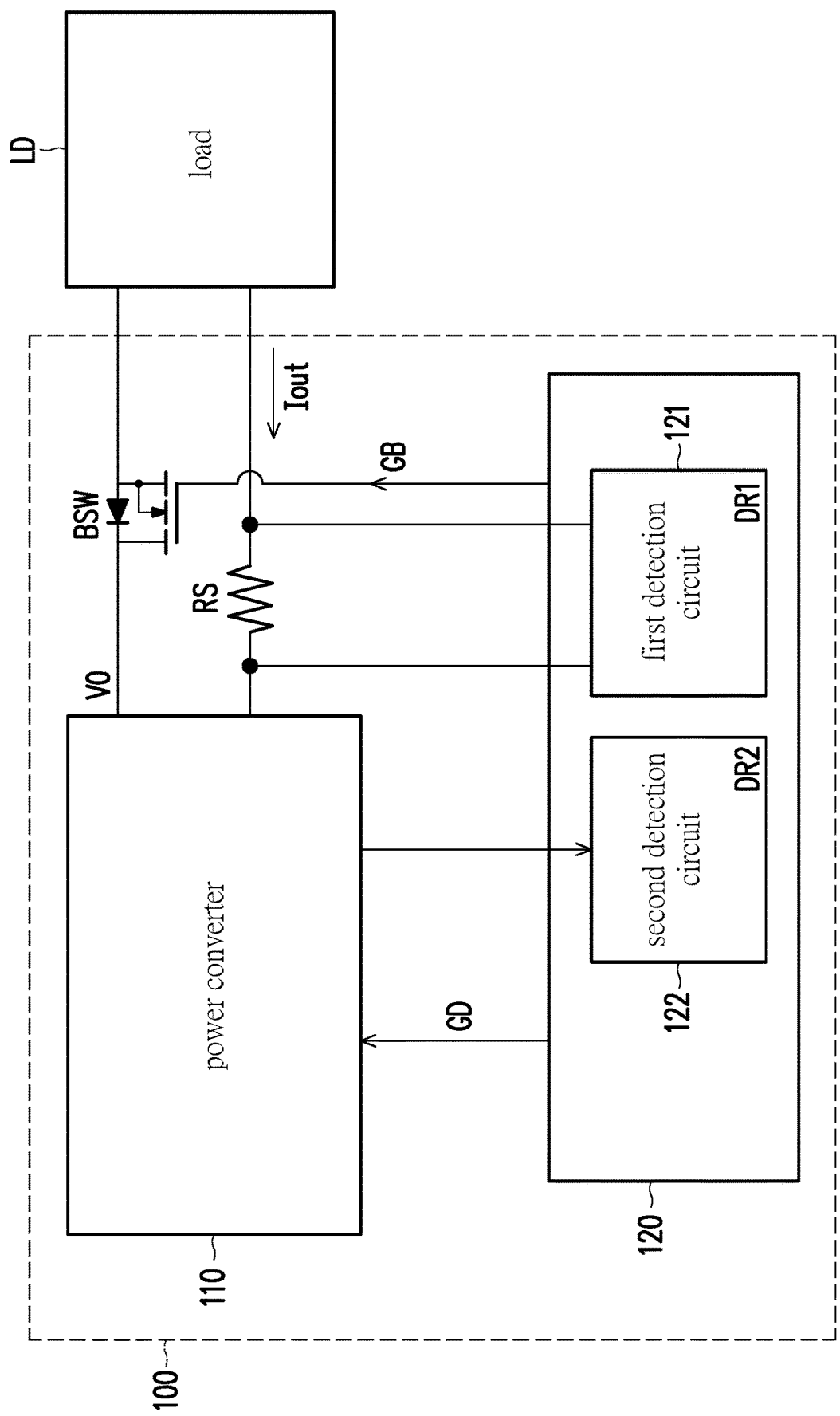
FIG. 1 is a schematic view of a power supply device according to the first embodiment of the disclosure.

Some embodiments of the disclosure will be described in detail below with reference to the accompanying drawings. Reference numerals in the following description, when the positively correlated reference numerals appear in different drawings, will be regarded as positively correlated or similar elements. The embodiments are only a part of the disclosure, and do not disclose all possible embodiments of the disclosure. More precisely, the embodiments are only examples in the claims of the disclosure.

Referring to FIG. 1, FIG. 1 is a schematic view of a power supply device according to the first embodiment of the disclosure. In this embodiment, a power supply device 100 includes a power converter 110 and a controller 120. The controller 120 is coupled to the power converter 110. The controller 120 controls the power converter 110 to generate an output power VO. The controller 120 provides a control signal GD. The power converter 110 generates the output power VO in response to the control signal GD. In addition, based on the control of the controller 120, the power supply device 100 outputs the output power VO to a load LD.

In this embodiment, the controller 120 includes a first detection circuit 121 and a second detection circuit 122. The first detection circuit 121 detects the output power VO to obtain a first detection result DR1. The first detection result DR1 is a variation of an output current value of the output power VO.

Taking this embodiment as an example, the power supply device 100 further includes a detection resistor RS. The detection resistor RS is coupled between an output terminal of the power converter 110 and the load LD. An output current Iout of the output power VO flows through the detection resistor RS. Therefore, a voltage difference corresponding to the output current Iout is generated at two terminals of the detection resistor RS. The first detection circuit 121 detects the voltage difference at the two terminals of the detection resistor RS, and obtains the first detection result DR1 corresponding to the output current value based on the voltage difference at the two terminals of the detection resistor RS.

It should be noted that the first detection circuit 121 provides a precise detection method. The first detection result DR1 is equal to the variation of the output current value. Therefore, the controller 120 controls the power converter 110 in response to the first detection result DR1, so that the power supply device 100 complies with a safety standard (e.g., the safety standard IEC 60950). For example, the controller 120 controls the power converter 110 in response to the first detection result DR1, so that the power supply device 100 complies with limited power source (LPS) requirements of the safety standard IEC 60950. In the case of complying with the LPS requirements, based on the safety standard IEC 60950, the power supply device 100 does not need to provide a fire enclosure, but may use a relatively inexpensive enclosure material with a HB flammability rate. Therefore, the cost of the power supply device 100 may be reduced while complying with the LPS requirements.

In this embodiment, the second detection circuit 122 detects electrical characteristics other than the output current value to obtain a second detection result DR2. The controller 120 determines whether to limit output of the output power VO according to a relationship between the first detection result DR1 and the second detection result DR2. Taking this embodiment as an example, the controller 120 determines whether to stop the power supply device 100 from supplying the output power VO to the load LD according to the relationship between the first detection result DR1 and the second detection result DR2.

In some embodiments, the controller 120 determines whether to reduce a voltage or a current of the output power VO according to the relationship between the first detection result DR1 and the second detection result DR2.

In this embodiment, the second detection result DR2 is a variation of the electrical characteristics other than the output current value. However, a trend of the variation of the second detection result DR2 is still positively correlated or negatively correlated with the variation of the output current value. The controller 120 determines whether to limit the output of the output power VO according to the correlation between the first detection result DR1 and the second detection result DR2. For example, when the detection resistor RS is shorted, the variation does not occur in the first detection result DR1 does not vary. However, the variation occurs in the second detection result DR2. That is, the second detection result DR2 is independent of the first detection result DR1. Therefore, when the load LD may continuously receive the output power VO, the controller 120 determines that a first detection method has been invalid. The controller 120 enables the power supply device 100 to limit the output of the output power VO.

Herein, it is worth mentioning that the controller 120 determines whether to enable the power supply device 100 to limit the output of the output power VO according to the relationship between the first detection result DR1 and the second detection result DR2, for example, to stop the power supply device 100 from supplying the output power VO to the load LD. The controller 120 may determine whether detection of the first detection circuit 121 is invalid according to the second detection result DR2. When the detection of the first detection circuit 121 is determined to be invalid, the power supply device 100 limits the output of the output power VO. In this way, the power supply device 100 may avoid misoperation and/or safety hazards when the detection of the first detection circuit 121 is invalid.

In this embodiment, the power supply device 100 further includes a blocking switch BSW. A first terminal of the blocking switch BSW is coupled to the output terminal of the power converter 110. A second terminal of the blocking switch BSW is coupled to the load LD. A control terminal of the blocking switch BSW is coupled to the controller 120. The controller 120 turns on the blocking switch BSW to enable the power supply device 100 to supply the output power VO to the load LD. The controller 120 turns off the blocking switch BSW to enable the power supply device 100 to stop supplying the output power VO to the load LD. In this embodiment, when the detection of the first detection circuit 121 is determined to be normal, the controller 120 provides a control signal GB having a first voltage level (e.g., a high voltage level) to turn on the blocking switch BSW. Therefore, the power supply device 100 supplies the output power VO to the load LD. On the other hand, when the detection of the first detection circuit 121 is determined to be invalid, the controller 120 provides the control signal GB having a second voltage level (e.g., a low voltage level) to turn off the blocking switch BSW. Therefore, the power supply device 100 does not supply the output power VO to the load LD.

In this embodiment, the power converter 110 may be implemented by a flyback power converter, a boost converter, a buck converter, an LLC resonant power converter, an asymmetrical half-bridge (AHB) power converter, or one or any combination of other types of converters. In this embodiment, the load LD may be an electronic device or an electrical appliance.

In this embodiment, the second detection circuit 122 may obtain at least one second detection result DR2 through at least one detection method. Hereinafter, possible methods to obtain the second detection result DR2 will be exemplified in several embodiments.

Figure 2:
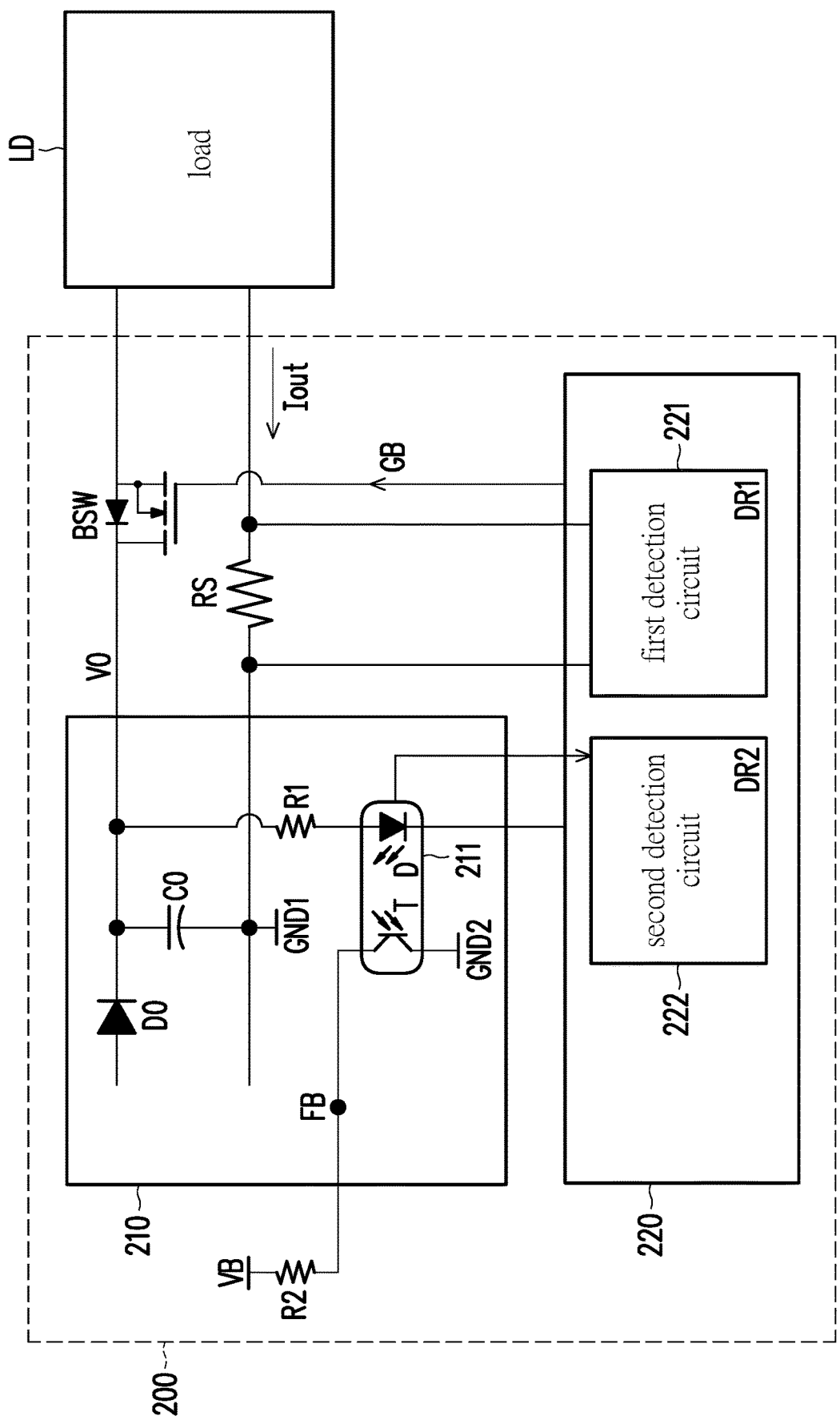
FIG. 2 is a schematic view of a power supply device according to the second embodiment of the disclosure.

Referring to FIG. 2, FIG. 2 is a schematic view of a power supply device according to the second embodiment of the disclosure. In this embodiment, a power supply device 200 includes a power converter 210, a controller 220, the blocking switch BSW, and the detection resistor RS. The power converter 210 includes a primary side and a secondary side. The power converter 210 includes an optocoupler 211. The optocoupler 211 includes a light emitting diode D and a phototransistor T. For example, an anode of the light emitting diode D is coupled to an output terminal of the power converter 210. A cathode of the light emitting diode D is coupled to the controller 220. The disclosure is not limited thereto. The secondary side of the power converter 210 includes an output diode DO and an output condenser CO. A cathode of the output diode DO is used as the output terminal of the power converter 210. A first terminal of the output condenser CO is coupled to the cathode of the output diode DO. A second terminal of the output condenser CO is coupled to a ground terminal GND1. The first terminal of the blocking switch BSW is coupled to the cathode of the diode. The detection resistor RS is coupled between the second terminal of the output condenser CO and the load LD.

In this embodiment, a first terminal of the phototransistor T is coupled to a voltage source VB. A second terminal of the phototransistor T is coupled to a ground terminal GND2. In an embodiment, the voltage source VB may be provided by a primary-side controller (not shown) on the same side as the phototransistor T. The first terminal of the phototransistor T is coupled to a connected node FB. Based on a class of the power converter 210, the ground terminal GND2 is different from the ground terminal GND1. In this embodiment, the controller 220 may, for example, receive the output power VO, and adjust a voltage value at the cathode of the light emitting diode D based on the variation of the output power VO. On the premise that the voltage value of the output power VO is approximately fixed, the output current value of the output power VO is correlated with a current value flowing through the light emitting diode D. Therefore, the variation of the output current value of the output power VO changes a turn-on current of the phototransistor T, thereby affecting a voltage level of the connected node FB or charge and discharge conditions. The controller 220 stabilizes the output power VO according to the voltage level of the connected node FB or the charge and discharge conditions. For example, the power converter 210 includes a power switch. The power switch performs a switching operation based on a control signal provided by the controller 220. The controller 220 adjusts a frequency or a duty cycle of the control signal according to the voltage level of the connected node FB or the charge and discharge conditions, thereby stabilizing the output power VO.

In this embodiment, a resistor R1 may be provided to limit the current value flowing through the light emitting diode D. A resistor R2 may be provided to limit a current value flowing through the phototransistor T.

The controller 220 includes a first detection circuit 221 and a second detection circuit 222. A detection operation of the first detection circuit 221 is substantially similar to a detection operation of the first detection circuit 121 in the first embodiment. Therefore, the same details will not be repeated in the following.

In this embodiment, the output current value of the output power VO is correlated with the current value flowing through the light emitting diode D. For example, the greater the output current value of the output power VO is, the greater the voltage value at the cathode of the light emitting diode D is. The current value flowing through the light emitting diode D is smaller. Therefore, the second detection circuit 222 detects the current value flowing through the light emitting diode. The second detection result DR2 is a variation of the current value flowing through the light emitting diode D. When the second detection result DR2 is positively correlated with the first detection result DR1, it indicates that the second detection result DR2 and the first detection result DR1 are contradictory. When the load LD continues to receive the output power VO, the first detection result DR1 is determined to have been invalid. The invalidation of the first detection result DR1 may cause the risk that the power supply device 200 may not comply with the LPS requirements. Therefore, the controller 220 controls the power supply device 200 to limit the output of the output power VO. In this embodiment, a first threshold and a second threshold are provided, and the second threshold is greater than the first threshold. When the variation of the first detection result DR1 is less than the first threshold, and the variation of the current value flowing through the light emitting diode D is greater than the second threshold, it indicates that the second detection result DR2 has a significant variation, while the first detection result DR1 has an extremely small variation (or no variation). Therefore, the trends of the second detection result DR2 and the first detection result DR1 are not consistent. When the load LD continues to receive the output power VO, the first detection result DR1 is determined to have been invalid. Therefore, the controller 220 controls the power supply device 200 to limit the output of the output power VO. In addition, when the second detection result DR2 is negatively correlated with the first detection result DR1, it indicates that both the trend of the second detection result DR2 and the trend of the first detection result DR1 are consistent. The first detection result DR1 is determined to be normal. Therefore, the controller 220 enables the power supply device 200 to supply the output power VO to the load LD.

Figure 3:
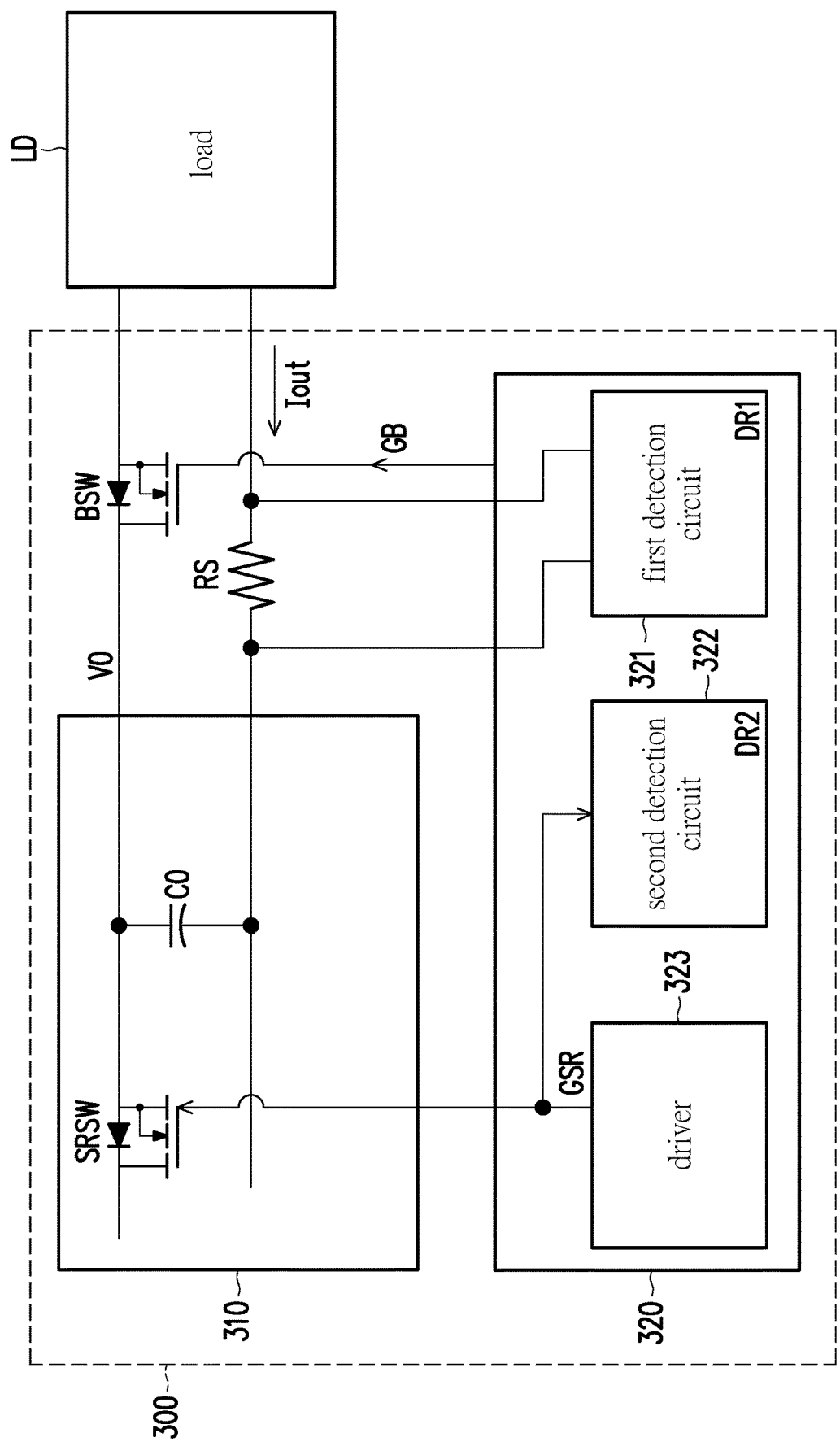
FIG. 3 is a schematic view of a power supply device according to the third embodiment of the disclosure.

Referring to FIG. 3, FIG. 3 is a schematic view of a power supply device according to the third embodiment of the disclosure. In this embodiment, a power supply device 300 includes a power converter 310, a controller 320, the blocking switch BSW, and the detection resistor RS. The power converter 310 includes a synchronous rectifying switch SRSW and the output condenser CO. Taking this embodiment as an example, a terminal of the synchronous rectifying switch SRSW is coupled to the first terminal of the output condenser CO as an output terminal (in which the disclosure is not limited thereto). In this embodiment, the synchronous rectifying switch SRSW performs a synchronous rectifying operation in response to a control signal GSR.

The controller 320 includes a first detection circuit 321 and a second detection circuit 322. A detection operation of the first detection circuit 321 is substantially similar to the detection operation of the first detection circuit 121 in the first embodiment. Therefore, the same details will not be repeated in the following.

The second detection circuit 322 detects time that the synchronous rectifying switch SRSW is turned on. Therefore, the second detection result DR2 is a variation of the time that the synchronous rectifying switch SRSW is turned on. Furthermore, the controller 320 further includes a driver 323. The driver 323 provides the control signal GSR having the duty cycle. The second detection circuit 322 receives and detects the control signal GSR, and obtains the time that the synchronous rectifying switch SRSW is turned on according to the duty cycle of the control signal GSR. The time that the synchronous rectifying switch SRSW is turned on is positively correlated with the output current value.

In this embodiment, the first threshold and the second threshold are provided, and the second threshold is greater than the first threshold. When the variation of the first detection result DR1 is less than the first threshold, and the variation of the time that the synchronous rectifying switch SRSW is turned on is greater than the second threshold, it indicates that the second detection result DR2 has the significant variation, while the first detection result DR1 has the extremely small variation (or no variation). The trends of the second detection result DR2 and the first detection result DR1 are not consistent. For example, when the detection resistor RS is shorted or opened, the first detection result DR1 indicates that the output current value is equal to 0 ampere. The second detection result DR indicates that the duty cycle of the control signal GSR is greater than a threshold (for example, 10% or 20%, and the disclosure is not limited thereto). When the load LD continues to receive the output power VO, the first detection result DR1 is determined to have been invalid. Therefore, the controller 320 controls the power supply device 300 to limit the output of the output power VO. When the second detection result DR2 is negatively correlated with the first detection result DR1, it indicates that the second detection result DR2 and the first detection result DR1 are contradictory. When the load LD continues to receive the output power VO, the first detection result DR1 is determined to have been invalid. Therefore, the controller 320 controls the power supply device 300 to limit the output of the output power source VO.

In addition, when the second detection result DR2 is positively correlated with the first detection result DR1, it indicates that both the trend of the second detection result DR2 and the trend of the first detection result DR1 are consistent. The first detection result DR1 is determined not to be invalid. Therefore, the controller 320 enables the power supply device 300 to supply the output power VO to the load LD.

Figure 4:
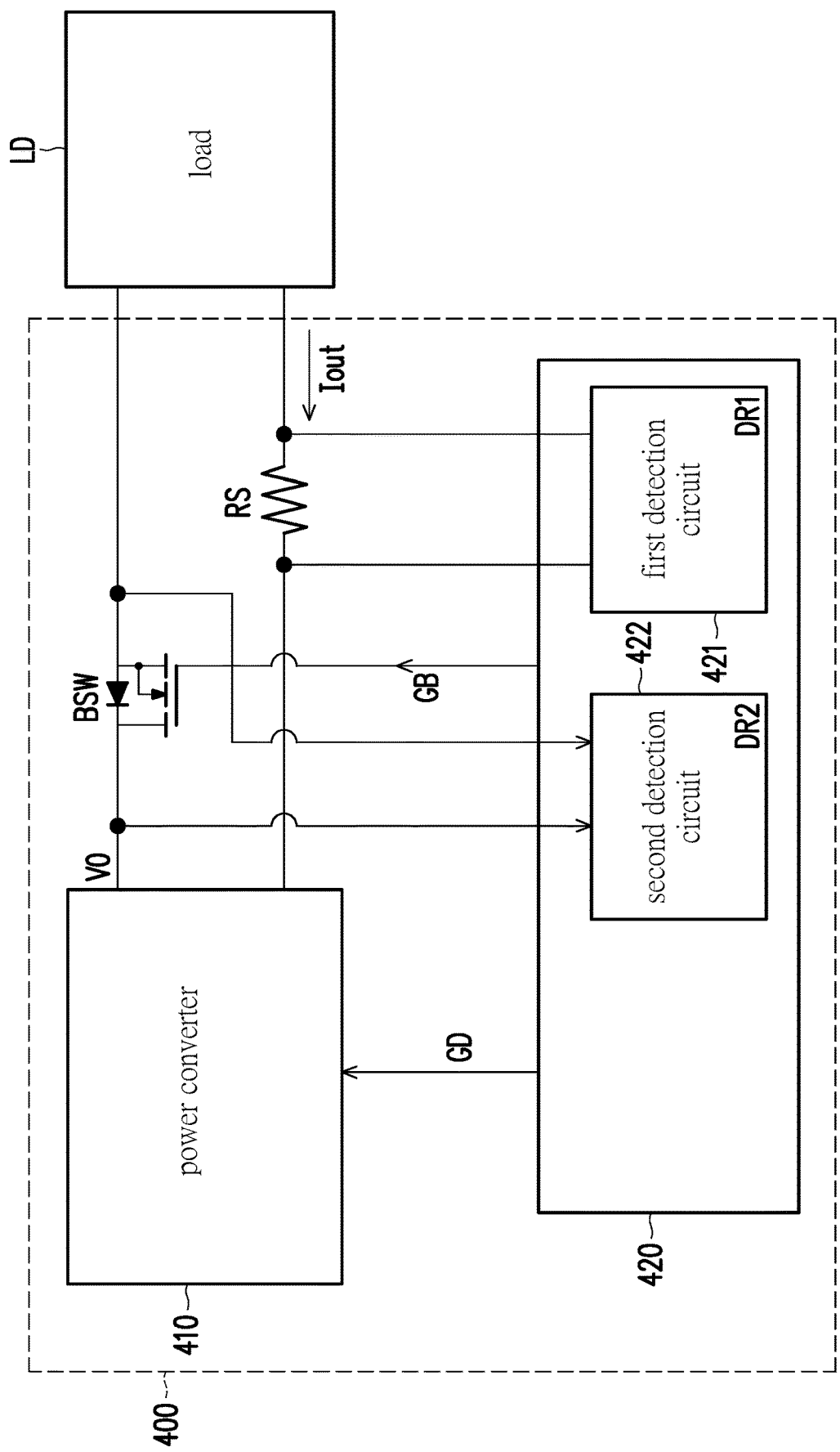
FIG. 4 is a schematic view of a power supply device according to the fourth embodiment of the disclosure.

Referring to FIG. 4, FIG. 4 is a schematic view of a power supply device according to the fourth embodiment of the disclosure. In this embodiment, a power supply device 400 includes a power converter 410, a controller 420, the blocking switch BSW, and the detection resistor RS. The controller 420 includes a first detection circuit 421 and a second detection circuit 422. A detection operation of the first detection circuit 421 is substantially similar to the detection operation of the first detection circuit 121 in the first embodiment. Therefore, the same details will not be repeated in the following.

In this embodiment, the second detection circuit 422 detects a turn-on voltage value of the blocking switch BSW. Furthermore, the second detection circuit 422 obtains in advance the turn-on voltage value of the blocking switch BSW in a turn-on state. When the blocking switch BSW is in the turn-on state, the second detection circuit 422 receives a voltage difference between the first terminal of the blocking switch BSW and the second terminal of the blocking switch BSW, and divides the voltage difference by the turn-on voltage value to obtain the turn-on voltage value of the blocking switch BSW. The turn-on voltage value of the blocking switch BSW is positively correlated with the output current value. Therefore, the second detection result DR2 is a variation of the turn-on voltage value.

In this embodiment, the first threshold and the second threshold are provided, and the second threshold is greater than the first threshold. When the variation of the first detection result DR1 is less than the first threshold, and the variation of the turn-on voltage value is greater than the second threshold, it indicates that the second detection result DR2 has the significant variation, while the first detection result DR1 has the extremely small variation (or no variation). The trends of the second detection result DR2 and the first detection result DR1 are not consistent. When the load LD continues to receive the output power VO, the first detection result DR1 is determined to have been invalid. Therefore, the controller 420 controls the power supply device 400 to control. When the second detection result DR2 is negatively correlated with the first detection result DR1, it indicates that the second detection result DR2 and the first detection result DR1 are contradictory. When the load LD continues to receive the output power VO, the first detection result DR1 is determined to have been invalid. Therefore, the controller 420 controls the power supply device 400 to control. In addition, when the second detection result DR2 is positively correlated with the first detection result DR1, it indicates that both the trend of the second detection result DR2 and the trend of the first detection result DR1 are consistent. The first detection result DR1 is determined not to be invalid. Therefore, the controller 420 enables the power supply device 400 to supply the output power VO to the load LD.

Figure 5:
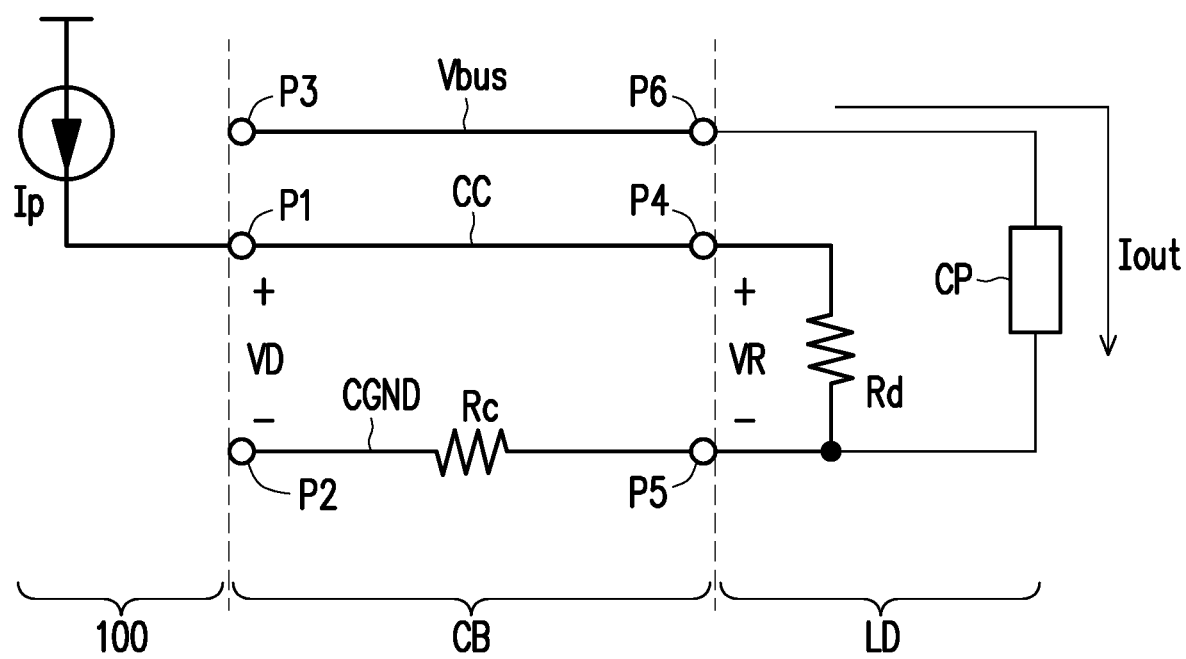
FIG. 5 is a schematic view of the power supply device supplying power to a load through a Type-C communication cable according to the first embodiment.

Referring to both FIGS. 1 and 5, FIG. 5 is a schematic view of the power supply device supplying power to a load through a Type-C communication cable according to the first embodiment. In this embodiment, the power supply device 100 further supplies power to the load LD through a communication cable CB complying with the Type-C protocol. The communication cable CB includes a power channel Vbus, a configuration channel CC, and a ground channel CGND. The configuration channel CC is coupled between a configuration channel pin P1 of the power supply device 100 and a configuration channel pin P4 of the load LD. The ground channel CGND is coupled between a ground channel pin P2 of the power supply device 100 and a ground pin P5 of the load LD. The power channel Vbus is coupled between a power pin P3 of the power supply device 100 and a power pin P6 of the load LD. The power supply device 100 further includes a current source Ip or an equivalent circuit. The current source Ip is configured to provide a constant current signal to the load LD. A pull-down resistor Rd of the load LD establishes a voltage difference VR at two terminals of the pull-down resistor Rd according to the constant current signal. The load LD and the power supply device 100 determine whether to perform communication or to supply and output the output power VO in response to the voltage difference VR at the two terminals of the pull-down resistor Rd.

In this embodiment, the second detection circuit 122 detects a voltage difference VD between the configuration channel pin P1 and the ground channel pin P2 of the power converter 110. Furthermore, the controller 320 may obtain the voltage difference VD between the configuration channel pin P1 and the ground channel pin P2 according to Formula (1).

$$VD=(i\_Iout+i\_Ip) \times r\_Rc + i\_Ip \times r\_Rd \qquad \text{Formula (1)}$$

In Formula (1), i_Iout is represented as a current value of the output current Iout; r_Rc is represented as a resistance value of an equivalent path resistance Rc on a transmission path of the output current Iout; i_Ip is represented as a current value of the constant current signal, and r_Rd is represented as a resistance value of the pull-down resistor Rd. In this embodiment, the transmission path includes the power channel Vbus, a current path CP inside the load LD, and the configuration channel CC. For convenience of description, the equivalent path resistance Rc in this embodiment is shown in configuration channel CC as an example.

In this embodiment, the current value of the constant current signal is significantly less than the current value of the output current Iout. The resistance value of the equivalent path resistance Rc is significantly less than the resistance value of the pull-down resistor Rd.

Therefore, Formula (1) may be simplified to Formula (2).

$$VD \approx i\_Iout \times r\_Rc + i\_Ip \times r\_Rd \qquad \text{Formula (2)}$$

The controller 320 may obtain the voltage difference VR at the two terminals of the pull-down resistor Rd according to Formula (3).

$$VR = i\_Ip \times r\_Rd \qquad \text{Formula (3)}$$

The voltage difference VR at the two terminals of the pull-down resistor Rd is equal to a product of the current value of the constant current signal and the resistance value of the pull-down resistor Rd. In the process of power supply, the voltage difference VR is a constant value. Therefore, based on Formulas (2) and (3), the voltage difference VD between the configuration channel pin P1 and the ground channel pin P2 is proportional to the current value of the output current Iout. Therefore, the second detection result DR2 of the second detection circuit 122 is a variation of the voltage difference VD.

In this embodiment, the first threshold and the second threshold are provided, and the second threshold is greater than the first threshold. When the variation of the first detection result DR1 is less than the first threshold, and the variation of the voltage difference VD is greater than the second threshold, it indicates that the second detection result DR2 has the significant variation, while the first detection result DR1 has the extremely small variation (or no variation). The trends of the second detection result DR2 and the first detection result DR1 are not consistent. The first detection result DR1 is determined to have been invalid. Therefore, the controller 320 controls the power supply device 300 to limit the output of the output power source VO. When the second detection result DR2 is negatively correlated with the first detection result DR1, it indicates that the second detection result DR2 and the first detection result DR1 are contradictory. The first detection result DR1 is determined to have been invalid. Therefore, the controller 320 controls the power supply device 300 to limit the output of the output power source VO. In addition, when the second detection result DR2 is positively correlated with the first detection result DR1, it indicates that both the trend of the second detection result DR2 and the trend of the first detection result DR1 are consistent. The first detection result DR1 is determined not to be invalid. Therefore, the controller 320 enables the power supply device 300 to supply the output power VO to the load LD.

In addition, when the current value of the output current Iout is equal to 0 ampere, the voltage difference VD between the configuration channel pin P1 and the ground channel pin P2 is substantially equal to the voltage difference VR. Therefore, the controller 320 may accurately obtain the current value of the output current Iout according to Formula (4).

$$i\_Iout = \frac{(VD - VR)}{r\_Rc} \qquad \text{Formula (4)}$$

Based on the above, the first detection circuit in the disclosure detects the output power to obtain the precise first detection result. The second detection circuit detects the electrical characteristics other than the output current value to obtain the second detection result. The controller may determine whether the detection of the first detection circuit is invalid according to the second detection result. When the detection of the first detection circuit is determined to be invalid, the controller controls the power supply device to limit the output of the output power source VO. The power supply device in the disclosure may avoid the misoperation and/or the safety hazards that may occur when the first detection result is invalid.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A power supply device, comprising:
   a power converter;
   a blocking switch, wherein a first terminal of the blocking switch is coupled to an output terminal of the power converter, and a second terminal of the blocking switch is coupled to a load; and
   a controller coupled to the power converter and the blocking switch, and configured to control the power converter to provide an output power, wherein the controller comprises:
   a first detection circuit configured to detect the output power to obtain a first detection result, wherein the first detection result is a variation of an output current value of the output power; and
   a second detection circuit configured to detect electrical characteristics of at least one of the power converter and the blocking switch to obtain a second detection result, wherein the electrical characteristics are different from the output current value,
   wherein the controller determines whether to limit output of the output power according to a relationship between the first detection result and the second detection result.

2. The power supply device according to claim 1, wherein the controller controls the power converter in response to the first detection result, so that the power supply device complies with limited power source requirements.

3. The power supply device according to claim 1, further comprising:
   a detection resistor coupled between an output terminal of the power converter and the load,
   wherein an output current of the output power flows through the detection resistor, and
   wherein the first detection circuit detects a voltage difference at two terminals of the detection resistor, and obtains the first detection result corresponding to the output current value based on the voltage difference at the two terminals of the detection resistor.

4. The power supply device according to claim 1, wherein the power converter further comprises:
   an optocoupler comprising a light emitting diode,
   wherein the second detection circuit detects a current value flowing through the light emitting diode,
   wherein the greater the output current value of the output power is, the greater a voltage value at a cathode of the light emitting diode is, and the smaller the current value flowing through the light emitting diode is, and
   the second detection result is a variation of the current value flowing through the light emitting diode.

5. The power supply device according to claim 4, wherein when the second detection result is positively correlated with the first detection result, the controller controls the power supply device to limit the output of the output power,
   when a variation of the first detection result is less than a first threshold, and the variation of the current value flowing through the light emitting diode is greater than a second threshold, the controller controls the power supply device to limit the output of the output power, wherein the second threshold is greater than the first threshold, and
   when the second detection result is negatively correlated with the first detection result, the controller enables the power supply device to supply the output power to the load.

6. The power supply device according to claim 1, wherein the power converter comprises:
   a synchronous rectifying switch performing a synchronous rectifying operation in response to a duty cycle,
   wherein the second detection circuit detects time that the synchronous rectifying switch is turned on, and
   the second detection result is a variation of the time that the synchronous rectifying switch is turned on.

7. The power supply device according to claim 6, wherein when a variation of the first detection result is less than a first threshold, and the variation of the time that the synchronous rectifying switch is turned on is greater than a second threshold, the controller controls the power supply device to limit the output of the output power, wherein the second threshold is greater than the first threshold, when the second detection result is negatively correlated with the first detection result, the controller controls the power supply device to limit the output of the output power, wherein the second threshold is greater than the first threshold, and when the second detection result is positively correlated with the first detection result, the controller enables the power supply device to supply the output power to the load.

8. The power supply device according to claim 1, wherein:

a control terminal of the blocking switch is coupled to the controller, the controller turns on the blocking switch to enable the power supply device to supply the output power to the load, and the controller turns off the blocking switch to stop supplying the output power to the load.

9. The power supply device according to claim 8, wherein the second detection circuit detects a turn-on voltage value of the blocking switch, the second detection result is a variation of the turn-on voltage value, when a variation of the first detection result is less than a first threshold, and the variation of the turn-on voltage value is greater than a second threshold, the controller controls the power supply device to limit the output of the output power, wherein the second threshold is greater than the first threshold, when the second detection result is negatively correlated with the first detection result, the controller controls the power supply device to limit the output of the output power, and when the second detection result is positively correlated with the first detection result, the controller enables the power supply device to supply the output power to the load.

10. The power supply device according to claim 1, wherein the power supply device supplies power to the load through a communication cable complying with a Type-C protocol, the communication cable comprises a power channel, a configuration channel, and a ground channel, the power supply device provides the output power through the power channel, the configuration channel is coupled between a configuration channel pin of the power supply device and a configuration channel pin of the load, the ground channel is coupled between a ground channel pin of the power supply device and a ground channel pin of the load, and the second detection circuit detects a voltage difference between the configuration channel pin and the ground channel pin of the power converter.

11. The power supply device according claim 10, wherein the second detection result is a variation of the voltage difference, when a variation of the first detection result is less than a first threshold, and the variation of the voltage difference is greater than a second threshold, the controller controls the power supply device to limit the output of the output power, wherein the second threshold is greater than the first threshold, when the second detection result is negatively correlated with the first detection result, the controller controls the power supply device to limit the output of the output power, and when the second detection result is positively correlated with the first detection result, the controller enables the power supply device to supply the output power to the load.

* * * * *